Figure 1:
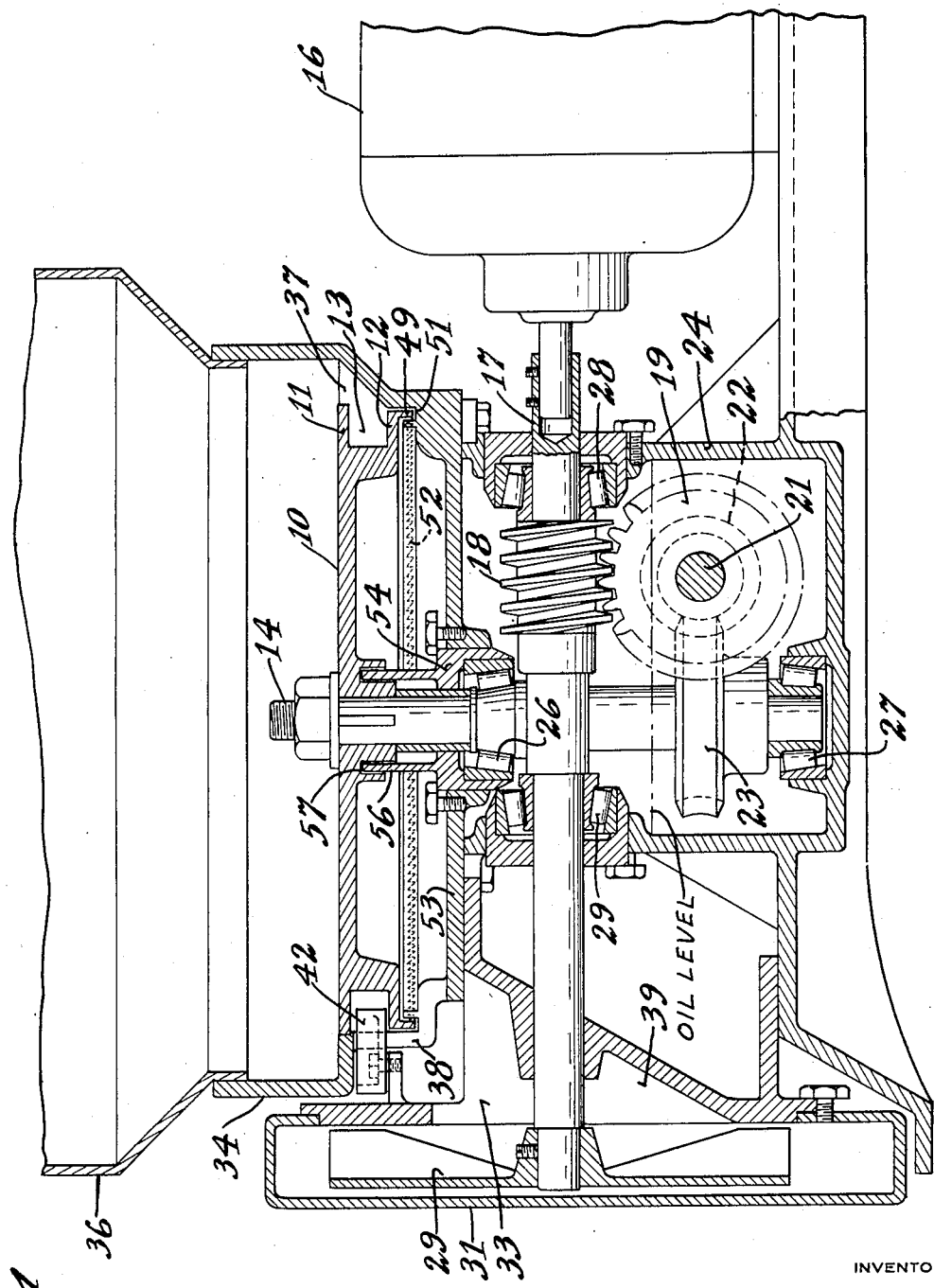

Jan. 30, 1934.  W. W. PETTIBONE  1,944,902

FEEDER FOR PULVERIZED MATERIALS
Filed July 22, 1932   2 Sheets-Sheet 1

INVENTOR
W. W. Pettibone
BY
Johnston & Jennings
ATTORNEYS

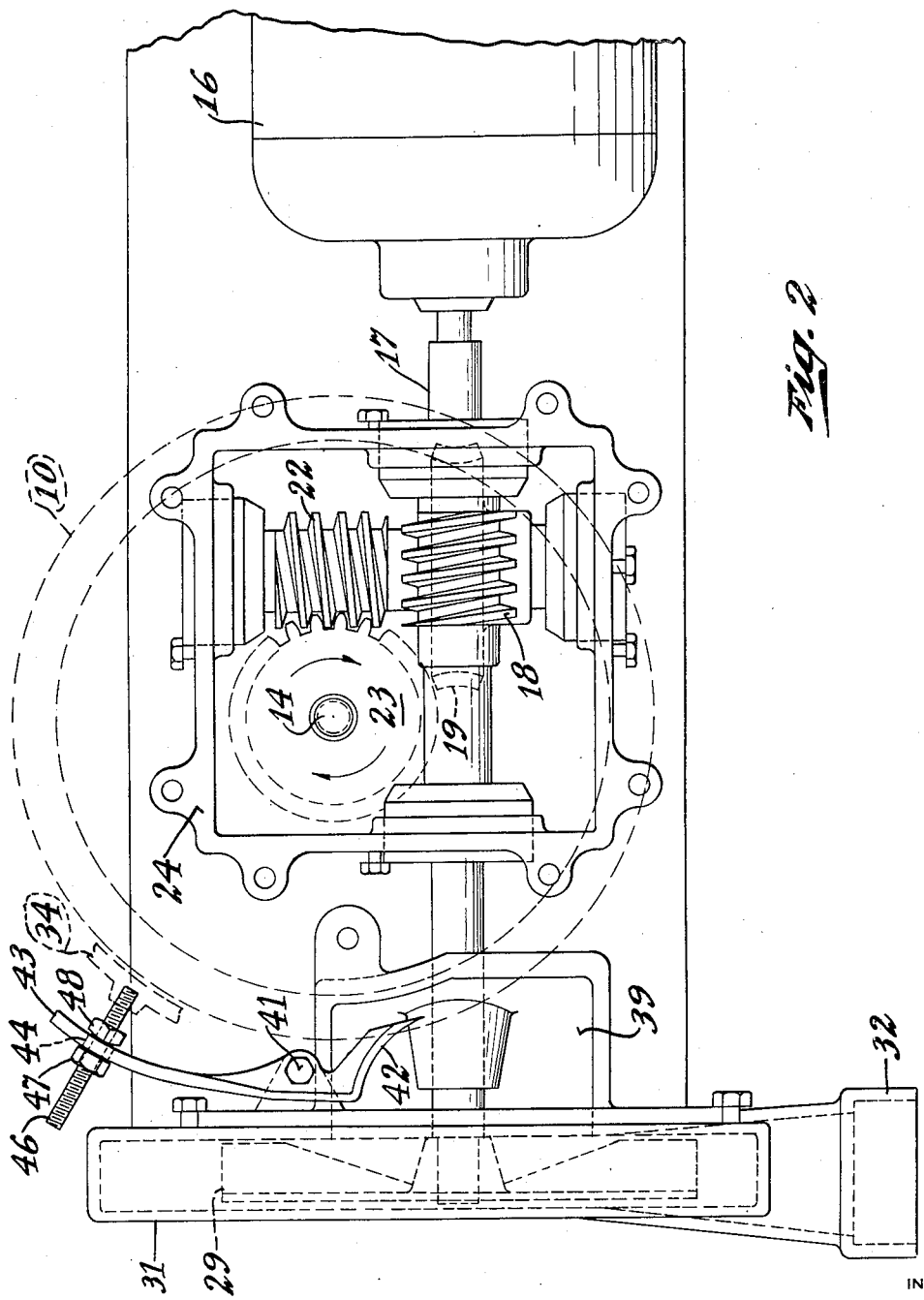

Patented Jan. 30, 1934

1,944,902

UNITED STATES PATENT OFFICE 1,944,902

FEEDER FOR PULVERIZED MATERIALS

Walter W. Pettibone, Erie, Pa.

Application July 22, 1932. Serial No. 623,980

7 Claims. (Cl. 302—42)

My invention relates to feeders for pulverized material, and has for its object the provision of apparatus of the character designated which shall be capable of delivering closely graduated variable amounts of material.

A still further object of my invention is to provide a feeder for pulverized material of improved design which shall be free of leakage of dust particles to the outside atmosphere and to the wearing parts of the apparatus and which shall, at the same time, embody a minimum of parts, freedom from undue friction, and consequently be durable in service.

A still further object of my invention is to provide a feeder of the class described which shall be particularly adapted for delivering pulverized fuel to a combustion furnace with a current of primary or conveying air, and wherein the volume of fuel delivered shall be predetermined and constant.

Briefly, my improved feeder embodies a rotary table having spaced horizontal flanges defining a peripheral groove. The table is disposed in a suitable housing from which the fuel feeds by gravity into the groove, and the housing is provided with a discharge opening adjacent the groove, and remote from the point at which the fuel is fed into the groove.

An adjustable scraper is pivotally mounted in the housing adjacent the discharge opening and positioned so as to remove a predetermined constant volume of material from the groove from whence it falls out through the discharge opening. A fan is mounted to operate opposite the discharge opening and a hopper leads from the discharge opening to the air inlet of the fan, whereby the pulverized fuel is mixed with air and is discharged from the fan to any suitable combustion apparatus.

My invention also contemplates various improvements in detail of design which will become apparent from a reading of this specification, a preferred embodiment of which is shown in the accompanying drawings forming a part of this application, wherein Figure 1 is a vertical sectional view of a feeder made in accordance with my invention; and Figure 2 is a sectional plan view of the same with the housing and rotary table removed.

Referring to the drawings, I show a table 10 having horizontal flanges 11 and 12 defining a relatively deep peripheral groove 13 around the table. The table is mounted on a vertical shaft 14 driven from a motor 16. The motor 16 is connected to a shaft 17 on which is mounted a worm 18 which coacts on its lower side with a gear 19. The gear 19 is mounted on a shaft 21 which carries a worm 22, the worm 22 meshing with a gear 23 mounted on the shaft 14 and which operates to turn the table.

The gear train just described is mounted in a housing 24 providing an oil reservoir in which the gears turn. The arrangement of the worm gear 18 above the gear 19, however, permits the high speed shaft 17 to operate above the oil level indicated by the dotted line and legend. The shaft 14 is mounted in suitable ball bearings 26 and 27, and the shaft 17 is mounted in ball bearings 28 and 29. Mounted on the outer end of the shaft 17 is a fan 29 having a casing 31 with a discharge nozzle 32. The air inlet of the fan is shown at 33.

Surrounding the table 10 is a housing 34 which defines a feed hopper for the table on the upper side thereof and is adapted to receive a container 36 for pulverized fuel, which may be inverted over the hopper as shown.

The housing 34 closely embraces the upper flange 11 of the table 10 except for a limited space 37 where it is cut away from the table to permit the access of material to the peripheral groove 13. The space, or port, 37 may be provided for any desired distance around the table 10. In the feeding of pulverized fuel, I have found that it should extend approximately 90° around the table in order that the peripheral groove 13 shall run full of material at all times.

The housing 34 extends downwardly beneath the upper level of the table 10 and is provided at 38 with a discharge opening. Beneath the discharge opening 38 is a small hopper 39 leading to the air inlet 33 of the fan 29, so that material falling from the groove 13 is mixed with air and discharged through the nozzle 32.

Pivotally mounted at 41, adjacent the discharge opening 38, is a scraper 42 which enters the groove 13 and serves to remove a predetermined amount of pulverized fuel from the groove and cause it to fall out through the discharge opening 38. The scraper 42 has an arm 43 extending outwardly alongside the housing 34, and which is provided with a slotted opening 44. A bolt 46 suitably mounted in the housing 34 extends through the slotted opening 44, and is provided with adjusting nuts 47 and 48 whereby position of the scraper 42 may be closely regulated to remove a predetermined amount of fuel from the groove.

In order to prevent undue friction of material leaking past the lower edge of the table 10, I provide a depending flange 49 on the lower horizontal flange 12 of the table 10, and form a groove 51 in the housing 34 in which the flange is adapted to rotate and which leads to the discharge opening 38. The lower flange 49 is provided with scrapers or teeth 52 which carry any material falling into the groove 51 around into the discharge opening 38 to be discharged there along with material removed by the scraper 42.

The housing 34 is provided with a solid bottom 53 in which is mounted the housing 54 for the upper roller bearing 26 of the shaft 14. The bearing housing 54 also embodies a vertical sleeve 56 which extends upwardly into a relatively deep groove 57 formed on the lower side of the table 10, and which effectively prevents the pulverized material from reaching the roller bearing 26.

Any material which might get into the space beneath the table 10 on the bottom 53 of the housing 34 is drawn by the fan 29 out through the discharge opening 38 so that there is no leakage of material to the outside air around the apparatus, and it is consequently clean in operation and adapted for use in household heating furnaces.

From the foregoing description, the operation of my improved apparatus will be apparent. The container for pulverized fuel 36 being inverted over the hopper 34, the motor 16 causes the table 10 to rotate, and the pulverized material feeds through the port opening 37, filling the groove 13. The material in the groove is carried around by the table in its rotation to the discharge opening 38, where the scraper 42 serves to remove a predetermined regulable amount of the fuel from whence it passes to the inlet of the fan 29 and is discharged, as has been described. The scraper 42 may be regulated to any desired depth in the groove 13, whereby to remove all or a part of the material being carried around in the groove. Any pulverized material leaking past the table into the groove 51 is removed, as described, by the teeth 52 on the flange 49 of the table.

The position of the discharge opening 38 with respect to the port 37 is important. As shown in the drawings, the discharge opening is at the other side of the rotary table from the port 37. This prevents the pulverized material from flowing in an unregulated amount which might occur with pulverized fuel if the inlet port and discharge opening were close together.

It will accordingly be apparent that I have devised an improved feeder for pulverized material which is simple and sturdy of construction, reliable in operation, and which is effective to deliver a predetermined regulable amount of material.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In apparatus of the character described, a rotary horizontal table having flanges defining a peripheral groove in the table, a housing closely encircling the table and having a feed port therein giving access to the groove and having a discharge opening remote from the port, a feed hopper disposed above the table, and a scraper disposed adjacent the discharge opening and adapted to remove material from the groove.

2. In apparatus of the character described, a rotary horizontal table having a peripheral groove therein, a housing surrounding the table and open at the top to permit the access of material to the upper side of the table, said housing being formed to permit access of material from the upper side of the table to the peripheral groove for a limited extent and being provided with a discharge opening on the under side of the table, and a scraper means adjacent the discharge opening and extending into the groove.

3. In apparatus of the character described, a rotary horizontal table having a peripheral groove therein, a housing surrounding the table and open at the top to permit the access of material to the upper side of the table, said housing being formed to permit access of material from the upper side of the table to the peripheral groove for a limited extent and being provided with a discharge opening on the under side of the table, a scraper means adjacent the discharge opening and extending into the groove, and means for adjusting the position of the scraper means in the groove.

4. In apparatus of the character described, a rotary horizontal table having a peripheral groove therein, a housing surrounding the table and open at the top, said housing being formed to permit access of material from the upper side of the table to the peripheral groove for a limited extent, and being provided with a discharge opening on the under side of the table, a scraper means adjacent the discharge opening and extending into the groove, a fan adjacent the discharge opening, and means connecting the discharge opening and the air inlet of the fan.

5. In apparatus of the character described, a horizontal rotary table, upper and lower horizontal flanges on the table defining a peripheral groove, means to feed material in the groove at one point around the periphery of the table, and a scraper means for removing material from the groove at another point around the table.

6. In apparatus of the character described, a horizontal rotary table, upper and lower horizontal flanges on the table defining a peripheral groove, a housing surrounding the table and closely spaced with respect thereto, said housing being formed to afford access for material to flow into the groove for a limited distance around the table, and also being formed to provide a discharge opening in the housing opposite the groove, and a scraper adjustably mounted in the housing adjacent the discharge opening and adapted to remove material from the groove.

7. In apparatus of the character described, a horizontal rotary table, upper and lower horizontal flanges on the table defining a peripheral groove, a housing surrounding the table and closely spaced with respect thereto, said housing being formed to afford access for material to flow into the groove for a limited distance around the table, and also being formed to provide a discharge opening in the housing opposite the groove, a scraper adjustably mounted in the housing adjacent the discharge opening and adapted to remove material from the groove, a depending flange on the lower side of the table, a flange in the housing defining a groove for the depending flange on the table and leading to the discharge opening, and scraper means on the depending flange for removing material leaking into the groove.

WALTER W. PETTIBONE.